J. GODDARD.
PHOTOGRAPHIC FILM PACK ADAPTER.
APPLICATION FILED MAY 9, 1910.

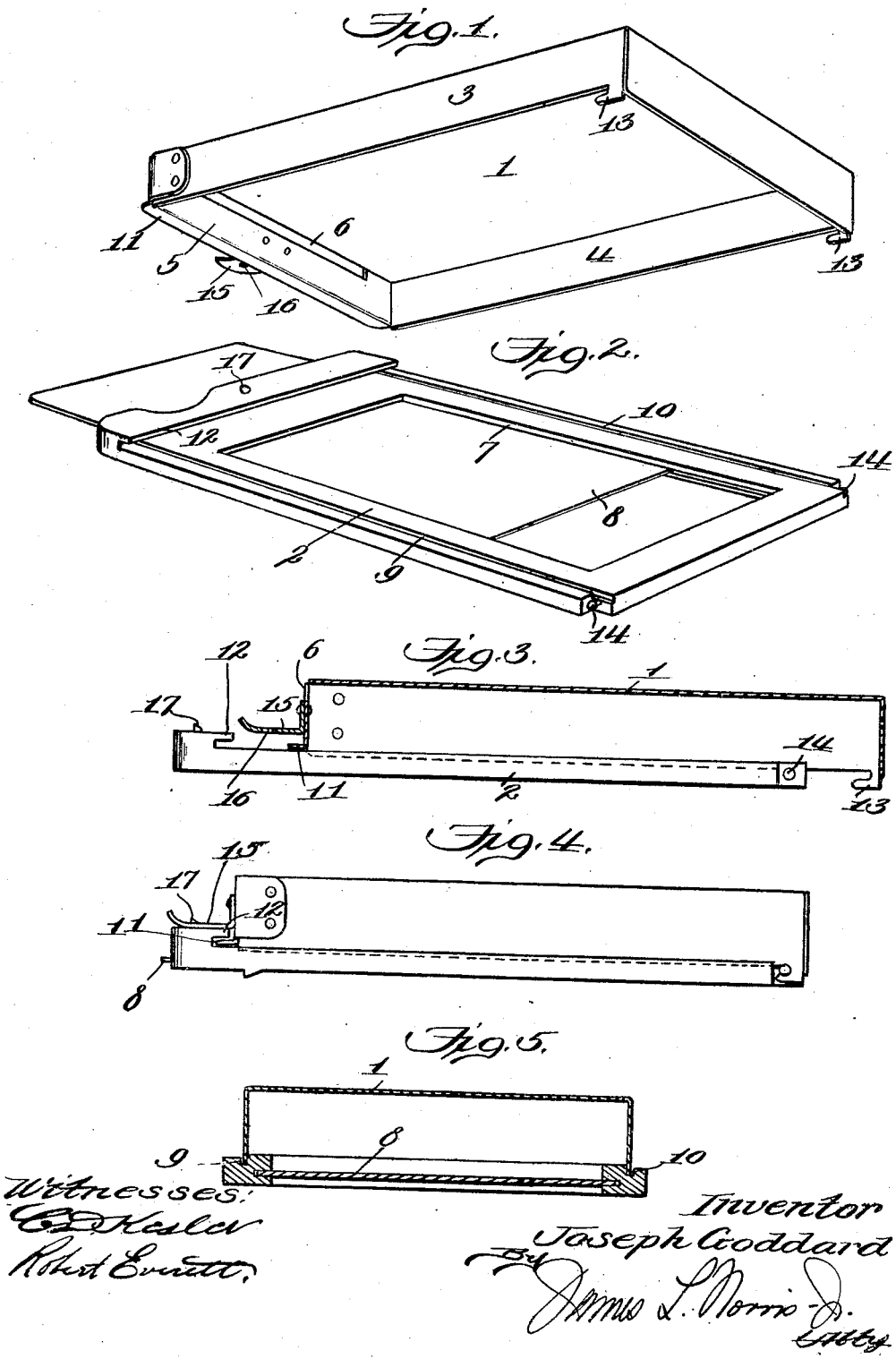

988,872.

Patented Apr. 4, 1911.

2 SHEETS—SHEET 2.

Witnesses:

Inventor
Joseph Goddard

UNITED STATES PATENT OFFICE.

JOSEPH GODDARD, OF ROCHESTER, NEW YORK, ASSIGNOR TO SENECA CAMERA MANUFACTURING COMPANY, OF ROCHESTER, NEW YORK, A CORPORATION OF NEW YORK.

PHOTOGRAPHIC-FILM-PACK ADAPTER.

988,872.  Specification of Letters Patent.  Patented Apr. 4, 1911.

Application filed May 9, 1910. Serial No. 560,105.

*To all whom it may concern:*

Be it known that I, JOSEPH GODDARD, a citizen of the United States, residing at Rochester, in the county of Monroe and State of New York, have invented new and useful Improvements in Photographic-Film-Pack Adapters, of which the following is a specification.

My present invention relates to improvements in photographic film pack adapters, and it has for its object to provide a simple and improved device of this character whereby a flat package of films may be readily inserted and contained therein for exposure in a camera and in such a manner as to perfectly prevent leakage of light to the interior of the adapter, and the films may be exposed with facility the adapter being composed of relatively detachable sections one of which forms a chamber to receive and hold the film pack and the other section forming a front or closure for such chamber and having the usual exposure opening and opaque slide, novel means being provided for effecting a perfectly light-tight fit between the sections and simple and efficient devices being provided for detachably connecting the sections, the preferred form of the invention involving a lockable connection whereby the sections are quickly connected and disconnected by a relative sliding movement between them.

To these and other ends, the invention consists in certain improvements, and combinations and arrangements of parts, all as will be hereinafter more fully described, the novel features being pointed out particularly in the claims at the end of the specification.

Figure 6:
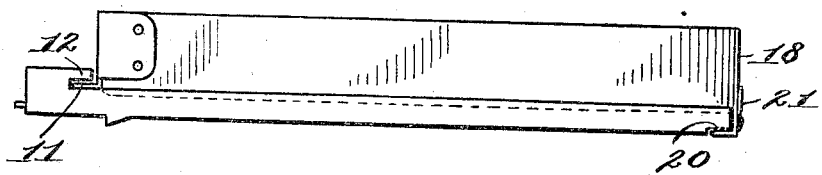
Figure 7:
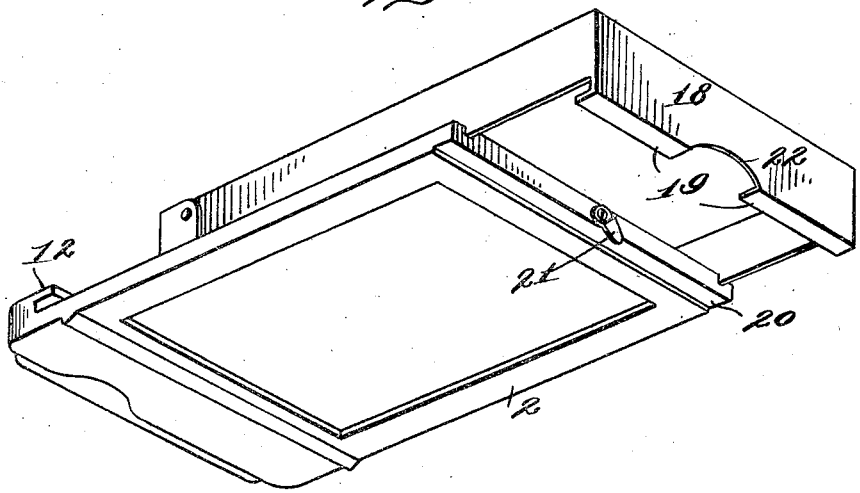

In the accompanying drawing:—Figures 1 and 2 are perspective views of the two sections of a film pack adapter constructed in accordance with my present invention, the sections being shown detached; Fig. 3 is a view of the adapter partly in side elevation and partly in section, the two parts of the adapter being shown in unlocked condition; Fig. 4 is a side elevation of the adapter showing the parts in locked relation and in condition for application to a camera; Fig. 5 represents a transverse section through the adapter as shown in the preceding figures; Fig. 6 is a view similar to Fig. 4 showing the adapter equipped with a slightly different form of catch for retaining the sections of the adapter in operative relation; and Fig. 7 is a perspective view of the adapter showing the sections in unlocked condition.

Similar parts are designated by the same reference characters in the several views.

Film pack adapters constructed in accordance with my present invention are capable of use in connection with the well known film packs wherein the cut films are assembled to form a flat package and the films are provided with tabs which serve to remove the films successively from exposing position.

In the accompanying drawing, I have shown certain embodiments of my invention in which the adapter which receives the film pack and positions it for exposure in the camera is composed of relatively separable sections, one forming a chamber for the pack and the other forming a front or closure, and certain specific devices are provided for locking the sections together and for maintaining a perfectly light-tight fit between them. It will be understood, however, that certain modifications and changes may be made in the detail construction or the relative arrangement of the parts in order that the invention may be applied to the best advantage according to the circumstances of each particular case, and the invention is not limited necessarily to the precise details shown.

In the present instance, the adapter consists of a casing or chamber 1 and a front section or closure 2 which constitute relatively separable sections of the adapter. The casing or chamber 1 may be made conveniently of aluminum or any other suitable material or metal and it is closed at the back and also at its four edges in order to prevent any light from possibly reaching the interior of the film pack and thereby fogging the sensitized films. The longitudinal sides 3 and 4 of the casing or chamber are parallel and the front 5 is provided with a slot or opening 6 which is of a size and shape to receive the usual film-adjusting or manipulating tabs of the pack, these tabs projecting through the slot 6 to the exterior of the adapter in order that they may be conveniently grasped and pulled to remove the films from exposing position.

The front section 2 which detachably receives the casing or chamber 1 may be conveniently formed as a frame of wood or otherwise, it having an exposure opening 7 and being slotted and grooved to receive an opaque slide 8, this slide serving to close the exposure opening 7 except at those times when the films are being exposed in the camera.

According to the present invention, the casing or chamber 1 is loaded by detaching it from the front section, this casing or chamber presenting an unobstructed opening to readily receive the pack, and the chamber or casing 1 containing the pack is then applied to the front section in such a way as to form a perfectly light-tight fit therewith so as to protect the pack, and devices are provided for locking and retaining the two sections of the pack in assembled relation. In the present instance, I prefer to form a pair of longitudinal grooves 9 and 10 in the front section 2 which grooves are of such a width and location as to receive the edges of the longitudinal sides 3 and 4 of the casing 1, the interengaging of the sides of the casing and the grooves of the front section effectually breaking the joint between these sections and forming a light-tight connection. Owing to the resulting convenience in manipulation of the parts, I so construct the sections of the adapter as to provide locking devices which are locked and unlocked by a relative sliding movement between the sections, the grooves 9 and 10 serving as guides for the casing or chamber during the locking and unlocking operations. This locking action may be obtained in different ways. In Figs. 1 to 4 inclusive, I provide the front 5 of the casing or chamber with a forwardly directed flange 11 which preferably lies in a plane parallel to the plane of relative movement between the sections or substantially so, and this flange is adapted, when the sections are moved toward locking position, to engage beneath and coöperate with an overhanging flange or projection 12 which is formed adjacent to the upper or forward end of the front section 2 so that when the flange 11 on the casing passes beneath the flange or shoulder 12 on the front section, the upper or forward ends of the casing and front section are held in close and coöperative relation and with the edges of the sides 3 and 4 engaging in the bottoms of the grooves 9 and 10. The lower or rear ends of the casing and front section are also provided with means for retaining them in close and coöperative relation by devices which are connected and disconnected by the relative sliding movement between the sections. In Figs. 1 to 4 inclusive, the casing is provided with a pair of hooks 13 which may proceed edgewise from the sides 3 and 4 of the casing and depend below those edges of the sides which engage the grooves, and these hooks are adapted to coöperate with a pair of suitably located pins or projections 14 which are fixed to the front section 2. The construction is such that when the two sections of the pack are relatively shifted, the flange 11 and the hooks 13 will simultaneously engage the flange 12 and the projections 14 to hold the relatively separable sections of the adapter in coöperative relation. Suitably beveled or wedge surfaces are preferably formed upon the forward ends of the hooks 13 as shown to insure drawing of the sections in close relation so as to positively exclude light.

A suitable catch is preferably provided to completely lock the sections of the adapter in coöperative relation. In Figs. 1 to 4 inclusive, I provide a spring catch 15 which is capable of operating automatically while the sections are being moved into position, this catch as shown consisting of a resilient tongue which may be fastened to either of the adapter sections, it being illustrated in the present instance as applied to the front 5 of the casing and it has an aperture 16 adapted to receive a coöperative projection 17 which is fixed to the forward portion of the front section. This projection may be beveled and the forward end of the catch 15 may be beveled or upturned as shown to facilitate engagement of the parts and, moreover, the upturning of the free end of the catch 15 provides a finger portion to facilitate an unfastening of the catch.

In that form of the invention shown in Figs. 6 and 7, the casing or pack-receiving chamber 1 and the front section are formed substantially as in the preceding construction. Somewhat different means, however, is provided for holding the rear portions of the casing and front section in coöperative relation and a different form of catch is provided for completely locking the adapter sections in coöperative relation. In this instance, the rear wall 18 has its edge bent laterally to form forwardly directed hooks or flanges 19, and the forward face of the front section 2 is provided adjacent to its rear edge with a rabbet 20 to receive the hooks and flanges 19 on the casing as the latter is slid into locking position. The forward portions of the casing and front section of the adapter may be held in coöperative relation in the manner shown in the preceding figures. In Figs. 6 and 7, I also provide a simple form of catch which may be used in place of the catch 15 in the preceding instance. This catch 21 is pivotally attached to one of the parts, preferably the rear edge of the front section 2, and after the two sections of the adapter have been brought into coöperative relation, this catch 21 may be turned into a position to overlap or coöperate with the rear wall 18 of the casing, thereby completely locking the parts in coöperative relation. The rear wall of the casing is preferably recessed as at 22 to form a clearance for the catch when the latter has been moved into an inoperative position, thereby permitting the casing to be readily separated from the front section.

I claim as my invention:—

1. A photographic film pack adapter comprising relatively separable sections, one section forming a chamber to receive and inclose a film pack and the other section forming a front or closure for said chamber and provided with an exposure opening and a controlling slide therefor, and complemental catches on the respective sections coöperative to retain such sections in connected operative relation, relative separation of the sections permitting a film pack to be removed or inserted with respect to that section which forms the chamber.

2. A photographic film pack adapter comprising a pair of detachably related sections, one section forming a chamber to receive and inclose a film pack and having a slot to permit the manipulating tabs of the pack to project to the exterior of the adapter and the other section forming a front or closure for such chamber and provided with an exposure opening and a controlling slide therefor, and complemental devices on the respective sections of the adapter and operative to automatically hold such sections in operative relation when the sections are brought into such relation.

3. A photographic film pack adapter comprising a pair of slidably related sections, one section forming a chamber to receive and contain a film pack and having a slot through which the manipulating tabs of the pack may extend to the exterior of the adapter, and the other section having an exposure opening through which the films of the pack may be exposed, and complemental locking means carried by the sections and lockable automatically when the sections are relatively shifted into coöperative relation, whereby the sections are locked in such relation.

4. A photographic film pack adapter comprising a pair of sections, one having means for guiding the other for relative sliding movement, one section forming a chamber to receive and contain a film pack, and the other section having an opening through which the films of the pack contained in said chamber may be exposed, and devices on the sections for locking them in coöperative relation, said devices being locked by a relative sliding movement between the sections.

5. A photographic film pack adapter comprising a pair of sections, one forming a chamber to contain a film pack and having an opening to receive such pack and the other forming a closure for the opening of said chamber and having an exposure opening, and devices carried by the sections for detachably locking the sections in coöperative relation.

6. A photographic film pack adapter comprising a pair of relatively movable and detachable sections, one section forming a chamber to receive a film pack and the other section forming a closure for said chamber and having an exposure opening, and devices on said sections adapted to be engaged and disengaged by a relative movement between the sections for locking the latter in coöperative relation.

7. A photographic film pack adapter comprising a pair of slidably related sections, one section forming a chamber to contain a film pack and having a slot through which the manipulating tabs of the pack may project to the exterior of the adapter and the other section forming a front or closure for said chamber and also having an exposure opening and a controlling slide, and complemental devices arranged on both sections of the adapter and operative to automatically hold such sections in operative relation by a relative sliding movement between the sections.

8. A photographic film pack adapter comprising a pair of sections capable of a relative longitudinal sliding movement, one section forming a chamber to receive a film pack and the other section forming a closure for such chamber, and complemental devices on both sections of the adapter for locking the sections in coöperative relation, said devices being arranged upon corresponding ends of the sections and adapted to be engaged by such relative sliding movement between the sections.

9. A photographic film pack adapter comprising a pair of separable sections, one forming a chamber to receive a film pack and the other section adapted to form a closure for such chamber, one of such sections being grooved to receive and guide portions of the other section, and complemental devices automatically arranged on both sections and operative to lock the sections together when the same are relatively shifted.

10. A photographic film pack adapter comprising a casing adapted to receive a film pack and having an opening to receive the manipulating tabs thereof, a frame grooved to slidably receive said casing and to form a light-tight fit therewith, said frame having an exposure opening and a controlling slide therefor, and means for locking the casing and frame in coöperative relation, said means being arranged adjacent to the forward and rear ends of the casing and frame and lockable by a relative sliding movement between the casing and frame.

11. A photographic film pack adapter comprising a pair of slidably related sections, one section forming a casing or chamber to receive a film pack and the other section forming a closure for said casing and having an exposure opening, devices arranged upon corresponding ends of said sections and operative by a relative sliding movement between the sections to hold the same together, and a device carried by one of the sections and coöperative with the other section to lock the sections in operative relation.

12. A photographic film pack comprising a casing adapted to receive a film pack and having an aperture for the passage of the manipulating tabs thereof, a frame grooved to slidably engage and receive said casing and having an exposure opening, coöperatively arranged flanges formed on the forward portions of the casing and frame and adapted to be engaged and disengaged by a relative sliding movement between such parts, coöperative devices arranged at corresponding ends of the casing and frame and adapted to be engaged during such relative sliding movement between the parts, and a device for preventing relative sliding movement between the parts to retain them in locked relation.

In testimony whereof I have hereunto set my hand in presence of two subscribing witnesses.

JOSEPH GODDARD.

Witnesses:
F. K. TOWNSEND,
NELLIE A. BRANNIGAN.

---

Copies of this patent may be obtained for five cents each, by addressing the "Commissioner of Patents, Washington, D. C."